US006391977B1

(12) United States Patent
Yu et al.

(10) Patent No.: US 6,391,977 B1
(45) Date of Patent: *May 21, 2002

(54) IMPACT MODIFIER FOR THERMOPLASTIC POLYOLEFINS

(75) Inventors: Thomas Chen-Chi Yu, Bellaire, TX (US); Peter James Kay, Bacchus Marsh (AU); Trazollah Ouhadi, Liege (BE)

(73) Assignees: Exxon Mobil Chemical Patents Inc, Houston, TX (US); Advanced Elastomer Systems, L.P., Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,300

(22) Filed: Jun. 12, 1998

(51) Int. Cl.$^7$ .......................... C08L 23/00; C08L 23/04; C08L 9/00
(52) U.S. Cl. ........................ 525/240; 525/232
(58) Field of Search ................. 525/240, 232

(56) References Cited

U.S. PATENT DOCUMENTS

| 4,459,385 A | | 7/1984 | McCullough, Jr. | |
| 4,493,923 A | * | 1/1985 | McCullough, Jr. | 525/88 |
| 4,692,496 A | | 9/1987 | Bahl et al. | |
| 5,591,795 A | | 1/1997 | Nomura et al. | |
| 5,624,991 A | * | 4/1997 | Harada et al. | 524/451 |
| 5,747,592 A | * | 5/1998 | Huff et al. | 525/191 |
| 5,932,659 A | * | 8/1999 | Bambara et al. | 525/240 |

FOREIGN PATENT DOCUMENTS

| EP | 0 198 981 A2 | 10/1986 |
| EP | 0 328 051 B1 | 8/1989 |
| EP | 0 286 734 B1 | 12/1992 |

OTHER PUBLICATIONS

93–131417/16 A17 Abstract—Mitsubishi Petrochemical Co., Ltd. JP 05070661–A MITP 91.09.13 Thermopoplastic soft resin compsn. Giving articles with improved surface appearance—contg. Polypropylene block copolymer on ethylene propylene copolymer polymerised using vanadium catalyst, an ethylene propylene copolymer polymerised using titanium catalyst C93–058656 Addnl. Data: Nissan Motor Co., Ltd. (NSMO).
83–719429/30 A17 Abstract—Idemitsu Petrochem KK IDEM 10.12.81—J5 8101–135–A 10.12.81–JP–197682 (16.06.83) COBI–21 COBI–23/10 Polypropylene compsn. With high impact strength etc. —contg. Crystalline polypropylene, linear, low density polyethylene, and thermoplastic elastomer.

* cited by examiner

*Primary Examiner*—Patrick D. Niland

(57) ABSTRACT

The invention relates to a composition of a blend of an ethylene/propylene random copolymer and a low to very low density ethylene/$C_4$ to $C_{20}$-α-olefin random copolymer and its use as an impact modifier for polyolefin compositions. The invention further relates to polyolefin compositions, particularly polypropylene compositions, comprising said impact modifier composition.

13 Claims, No Drawings

IMPACT MODIFIER FOR THERMOPLASTIC POLYOLEFINS

BACKGROUND OF THE INVENTION

1. Field of the Invention

The present invention relates to a synergistic combination composition comprising an ethylene/propylene random copolymer and a low to very low density ethylene/α-olefin random copolymer wherein the α-olefin contains at least 4 carbon atoms. It further relates to polyolefin compositions, in particular polypropylene compositions comprising said synergistic impact modifier combination and a method for improving the impact strength resistance of polyolefin, i.e., the use of said combination as an impact modifier for polyolefins, such as, in particular polypropylene.

2. Description of the Related Art

Crystalline polypropylene is excellent in rigidity, heat resistance, surface gloss, etc., however, the impact resistance of polypropylene is poor and consequently polypropylene is not suitable for many applications.

Various methods have been proposed to improve the impact resistance of polypropylene, for instance, incorporating into crystalline polypropylene modifiers such as polyethylene or rubbery substances, etc. Consequently, a rubbery substance (rubber component), an amorphous or a low crystalline ethylene/propylene random copolymer, polyisobutylene, polybutadiene, etc. are generally used.

In order to improve the impact resistance of polypropylene by incorporation of such a rubbery substance into said polypropylene, however, a large amount of said rubbery substance must be added to the polypropylene. Due to the presence of a large amount of said rubbery substance in the polypropylene composition the impact resistance was in fact improved. However, the rigidity, heat resistance and surface hardness of said compositions was deteriorated. It was proposed in the art to incorporate into said rubbery substance containing polypropylene composition, an inorganic filler such as talc in order to impart rigidity to the compositions.

However, the improvement of the rigidity of a rubbery substance containing polypropylene composition by way of the addition of an inorganic filler is limited.

U.S. Pat. No. 5,591,795 discloses impact modified propylene compositions comprising 60 to 85% by weight of a propylene block copolymer, 10 to 25% by weight of an ethylene/α-olefin random copolymer rubber prepared by using a vanadium-containing catalyst or a metallocene-containing catalyst and 5 to 15% by weight of an inorganic filler, such as talc. The polypropylene is dispersed in the rubber component, which forms the matrix.

It is an object of the present invention to provide an impact modifier which is most suitable for imparting impact resistance to polyolefin compositions, in particular to polypropylene compositions.

Furthermore, it is an object of the present invention to provide a method for imparting impact resistance to polyolefin compositions, in particular to polypropylene compositions, i.e., using the impact modifier according to the present invention to improve the impact strength of polyolefin compositions, in particular of polypropylene compositions.

As a further object of the present invention there should be provided polyolefin compositions, and in detail, polypropylene compositions being improved in their impact strength.

It goes without saying that the overall object is to achieve a superior balance of the important properties of the resulting polyolefin compositions and in detail of the polypropylene compositions by the impact modifier of the present invention. An excellent impact strength should be achieved, while maintaining a superior balance of the overall properties such as melt flow capability, toughness, rigidity and excellent surface aspect.

SUMMARY OF THE INVENTION

It has surprisingly been found that the incorporation of a combination of an ethylene/propylene random copolymer (EP) with a low to very low density ethylene/$C_4$ to $C_{20}$-α-olefin random copolymer shows an synergistic effect in the improvement of the impact resistance of polypropylene compositions while maintaining a good balance of the other important properties, such as melt flow, rigidity, heat resistance and surface aspect.

The combination of the two above-mentioned copolymers can be added to the polyolefin to be modified as a blend or independently.

DETAILED DESCRIPTION OF THE INVENTION

In detail, in a first aspect the present invention relates to a composition comprising in a blend (a) 5 to 95% by weight of at least one ethylene/propylene random copolymer, and (b) 95 to 5% by weight of at least one low to very low density ethylene/$C_4$ to $C_{20}$-α-olefin random copolymer, based on the total amount of (a) and (b).

Preferably, the ethylene/propylene random copolymer (a) is present in the impact modifier composition (blend) in an amount of 10 to 90% by weight, most preferably 20 to 80% by weight, based on the total amount of (a) and (b).

It is preferred that the impact modifier blend composition according to the present invention contains 90 to 10% by weight, more preferably 80 to 20% by weight, based on the total amount of (a) and (b), of the low to very low density ethylene/α-olefin random copolymer (b).

It is to be noted that the above-mentioned ratio of copolymers (a) and (b) is not only applicable for the blend but also if (a) and (b) are added separately to the polypropylene composition to be modified.

1. Ethylene/propylene Random Copolymer

The ethylene/propylene random copolymer (a) contains up to 80 weight %, preferably from 40 to 65 weight % of ethylene, based on the random copolymer (a).

The ethylene/propylene random copolymer (a) may further contain comonomers selected from non-conjugated dienes such as 5-ethylidene-2-norbornene (ENB), 1,4-hexadiene, 5-methylene-2-norbornene (MNB), 1,6-octadiene, 5-methyl-1,4-hexadiene, 3,7-dimethyl-1,6-octadiene, 1,3-cyclopentadiene, 1,4-cyclohexadiene, dicyclopentadiene (DCPD) and 5-vinylnorbornene.

Said further comonomers may be present in the ethylene/propylene random copolymer (a) in an amount of up to 15 weight %, preferably in an amount of 0.1 to 5.0 weight %, based on the total amount of the ethylene/propylene random copolymer (a).

Preferably, the ethylene/propylene random copolymer (a) has a density of 0.850 to 0.900 g/cm$^3$ and an intrinsic viscosity [η] in decalin at 135° C. of 1 to 6 dl/g.

2. Low to Very Low Density Ethylene/α-olefin Random Copolymer

The ethylene/α-olefin random copolymer (b) present in the impact modifier blend contains the α-olefin in an amount of at least 5 weight %, preferably from 10 to 40 weight %, most preferably from 15 to 30 weight %, based on the total of the random copolymer (b).

The α-olefin to be copolymerized with ethylene is selected from monomers containing at least 4, preferably 4 to 20, more preferably 4 to 12 and most preferably 4 to 8 carbon atoms. Preferred monomers are selected from the group consisting of 1-butene, 1-pentene, 1-hexene, 1-heptene, 1-octene, 1-decene, 1-dodecene, 1-hexadodecene and mixtures thereof. Out of these comonomers 1-butene, 1-hexene and 1-octene are most preferred. The α-olefins may be present in the random copolymer (b) in a combination of at least two.

The ethylene/α-olefin random copolymer (b) present in the impact modifier composition of the present invention may also contain monomer units derived from monomers other than ethylene and the α-olefin mentioned above. For instance, units derived from dienes containing 5 to 20 carbon atoms, preferably those selected from the non-conjugated dienes mentioned above in context with copolymer (a), may be contained in the random copolymer (b). Preferably their amount is up to 15 weight %, based on the random copolymer (b).

The ethylene/α-olefin random copolymer (b) used in the blend according to the present invention preferably has the following physical properties:
 a Mooney viscosity ML (1+4) (ASTM D-1646), as measured at 121° C. is from 1 to 50, preferably from 8 to 40,
 a density of 0.860 to 0.925 g/cm$^3$, preferably from 0.865 to 0.910 g/cm$^3$ and most preferably from 0.865 to 0.900 g/cm$^3$,
 a melt flow index (MFI) according to ASTM D-1238 of from 0.2 to 30 dg/min, preferably from 0.5 to 20 dg/min.

The ethylene/α-olefin random copolymers (b) can be prepared in a known manner by conventional Ziegler-Natta catalysis or metallocene catalysis. Ethylene/α-olefin random copolymers prepared by metallocene catalysis are preferred. These methods are in great detail described in the literature to which it is referred herewith.

According to the invention it has surprisingly been found that the combination comprising (a) and (b) has a synergistic effect on the impact strength of the polypropylene composition to be modified. This means that the combination comprising copolymers (a) and (b) can be used to improve the impact strength resistance particularly of polypropylene compositions, at a level higher than expected from each individual blend ingredient (a) or (b).

Preferably the combination of (a) and (b) is added to the polyolefin to be modified as a melt or tumble blend comprising (a) and (b). The tumble blend can be prepared using any of the conventional tumble blender. The melt-blend of (a) and (b) can conveniently be manufactured in a known manner using conventional mixing devices such as a Banbury-mixer, Farrel continuous mixer (FCM), Henschel-mixer, V-blender, single-screw extruder, multiple-screw extruder or kneader. Mixing/blending of the components (a) and (b) is carried out at a temperature between 150 and 260° C., preferably between 150 and 220° C.

What is set out above is also applicable if two or more of copolymers (a) and/or two or more of copolymers (b) are employed.

3. Polypropylene

The polypropylene which is impact modified with the impact modifier blend according to the present invention is a conventional polypropylene and is selected from homopolymer, reactor polypropylene copolymer commonly called block-copolymer and random copolymer.

4. Impact Modified Polypropylene

The present invention also relates to a polypropylene composition comprising (i) a polypropylene
(ii) a combination of at least one ethylene/propylene random copolymer (a) as defined above, and at least one low to very low density, ethylene/α-olefin random copolymer (b) as defined above as the impact modifier, and
(iii) optional additives.

The polypropylene (i) is selected from the type of polypropylene mentioned above and the impact modifier (ii) is selected from the combination as defined above comprising at least one ethylene/propylene random copolymer (a) and at least one of the low to very low density ethylene/α-olefin random copolymer (b).

The optional additives (iii) which may be present in the modified polypropylene composition according to the present invention are selected from the group consisting of inorganic fillers, heat stabilizers, nucleating agents (which include aluminum salts of aromatic carboxylic acid, esters of aromatic phosphoric acid and dibenzylidene sorbitol), ultraviolet absorbers, slip-agents, antistatic agents, flame-retardants, pigments, dyes, inorganic fillers other than finely powdered talc, organic fillers and other polymers, for example, high-density polyethylene, EVA, EMA and EAA.

The inorganic filler mentioned above, which may be present in the impact modified polypropylene compositions according to the present invention, may be selected from finely powdered inorganic materials, for instance talc having an average particle diameter of 0.5 to 20 μm.

The total amount of optional additives may be up to 40% by weight, preferably up to 30% by weight, most preferably between 5 and 20% by weight, based on the total amount of the impact modified polypropylene composition.

The amount of inorganic filler may be up to 40% by weight, preferably up to 30% by weight, most preferably between 5 and 25% by weight, based on the total amount of the impact modified polypropylene composition. The total amount of optional additives including the inorganic filler, however, is not higher than 40% by weight.

The polypropylene composition of the present invention preferably contains from 40 to 96% by weight, preferably from 50 to 90% by weight of polypropylene (i), from 4 to 60% by weight, preferably from 7 to 30% by weight of the inventive impact modifier combination (ii), and from 0 to 40% by weight, preferably from 5 to 25% by weight of the optional additives (iii).

The polypropylene composition of the present invention may be obtained from the components (i), (ii) and optionally (iii) as mentioned above according to conventional known methods for preparing polyolefin compounds (blends), for instance, by feeding the components simultaneously or successively to a mixing device such as a multiple-screw extruder, single-screw extruder, kneader or Banbury mixer or FCM, Henschel mixer or V-blender.

The temperature at which blending is effected is between 150 and 260° C., preferably between 150 and 220° C.

In this context it should be noted that the impact modifier composition can be added to the polypropylene as a blend or individually, i.e., the at least one ethylene/propylene random copolymer (a) separately from the at least one low to very low density ethylene/α-olefin random copolymer (b).

Injection molded products formed from the polypropylene according to the present invention as described above may be utilized in a wide field of application, such as for automotive trims, particularly bumpers, instrumental panels, dashboards, etc.

The present invention is illustrated hereinafter in more detail with reference to examples which should not be construed as to limit the scope of the present invention.

The following test-methods were used:

| | |
|---|---|
| Izod impact: | ISO 180a |
| Charpy impact: | ISO 179a |
| Dart drop: | ISO 6603-2 (mass of 25.990 kg, height 1.032 m, hemispherical falling striker) |
| E-modulus: | ISO 527/1A |
| Stress at yield: | ISO 527/1A |
| Elongation at break: | ISO 527/1A |
| Flexural modulus: | ISO 178 |

In the following Table 1 the elastomer master-batch compositions comprising the ethylene/propylene random copolymer and the metallocene catalyzed ethylene/1-octene random copolymer (master batch MB2 to MB8 are according to the present invention) are shown:

TABLE 1

Elastomer Master Batch Composition

| Elastomer master batch composition | Elastomer MB1* | Elastomer MB2 | Elastomer MB3 | Elastomer MB4 | Elastomer MB5 | Elastomer MB6 | Elastomer MB7 | Elastomer MB8 |
|---|---|---|---|---|---|---|---|---|
| Vistalon V.606 | 66.6 wt % | | | | | | | |
| Vistalon V.785 | | 80 wt % | 75 wt % | 70 wt % | 60 wt % | 50 wt % | 40 wt % | 30 wt % |
| NCPE (HDPE) 7004 | 33.3 wt % | | | | | | | |
| Engage 8150 | | 19.9 wt % | 24.9 wt % | 29.9 wt % | 39.9 wt % | 49.9 wt % | 59.9 wt % | 69.9 wt % |
| Irganox B 215 | 0.1 wt % | 0.1 wt % | 0.1 wt % | 0.1 wt % | 0.1 wt % | 0.1 wt % | 0.1 wt % | 0.1 wt % |

*Comparative

EXAMPLES

The following abbreviations are used in the examples:

| | |
|---|---|
| Eltex ® PRV 210: | reactor propylene copolymer manufacturer: Solvay melt flow index (at 230° C., 2.16 kg load) = 9 g/10 min ethylene content = 7 to 9 wt % |
| APPRL 3250: | reactor propylene copolymer manufacturer: Appryl melt flow index (230° C., 2.16 kg load) = 25 g/10 min ethylene content = 7 to 9 wt % |
| Vistalon ® V.785: | ethylene/propylene copolymer manufacturer: Exxon Chemical mooney viscosity ML (1 + 4) at 125° C. = 30 ethylene content = 53.3 wt % |
| Vistalon ® V.606: | ethylene/propylene copolymer manufacturer: Exxon Chemical mooney viscosity ML (1 + 4) at 125° C. = 65 |
| Irganox ® B215: | blend of Irgafos ® 168 (2 parts) and Irganox ® 1010 (1 part) manufacturer: Ciba-Geigy |
| Talc Steamic 00S: | manufacturer: Talc de Luzenac |
| Engage ® 8150: | ethylene 1-octene copolymer manufacturer: DuPont Dow Elastomer density (ASTM D-792) = 0.868 melt flow index (DIN 53735-88) = 0.5 g/10 min comonomer content: 25 weight % |
| HDPE NCPE 7004: | high density polyethylene manufacturer: Borealis melt flow index (190° C., 2.16 kg load) = 4 g/10 min |

A-Preparation of the Blend

1. Preparation of the Impact Modifier Master-batch

The ethylene/propylene random copolymer is premixed with the ethylene/α-olefin random copolymer for masterbatch MB1, examples of the invention and with a high density poly-ethylene for the reference example.

These blends designated elastomer master batches MB1 to MB8 for the purposes of exemplifying the invention are melt mixed in a 1.3 liter internal Banbury mixer.

Mixing volume: 1.1 liter
Mixing temperature: 180 to 200° C.
Rotor speed: 155 rpm
Mixing time: 4 minutes 2. Blend with Polypropylene Polypropylene and the impact modifier (master batch MB1 to MB8) and other ingredients like talc and stabilizer are melt mixed in an internal 2.8 liter Banbury mixer. The volume used was about 2.6 liters. The compositions are summarized in Table 2 below.

Mixing temperature: 180 to 200° C.
Rotor speed: 130 rpm
Mixing time: 6 minutes

The final compound is granulated by using a Sigitta band granulator Type GR 250 SL. The granulates of the final polypropylene blend compound is then fed into a laboratory single-screw extruder (type 832001, Brabender) with a screw of a L/D-ratio=25 (D=19 mm), followed by underwater pelletizing.

B-Preparation of the test-specimen

All the test-specimens were prepared by injection-molding of the tested products into molds which correspond to the used norms as mentioned in the following Tables 2 and 3.

The molding machine was a Engel ES500/125 HL with 125 tons claming force. Typical injection molding conditions are:

Temperature profile:
zone 1 (nozzle): 210° C.
zone 2: 210° C.
zone 3: 190° C.
zone 4: 190° C.
mold 30° C.
injection pressure (bar): 43.5
  Injection speed (mm/s): 50
  Injection time(s): 0.60
Second pressure: (bar): 32
Second pressure time(s): 15
Cooling time(s): 30
Plastification (mm): 40
Back pressure (bar): 5

The results obtained are shown in the following Tables 2 and 3, respectively. Examples 1, 2, 3, 11 and 12 are comparative examples, i.e., not according to the invention.

TABLE 2

|  | Example 1* | Example 2* | Example 3* | Example 4 | Example 5 |
|---|---|---|---|---|---|
| Impact Modified PP Composition | | | | | |
| Eltex PRV 210 | 70 wt % | 70 wt % | 70 wt % | 70 wt % | 70 wt % |
| Vistalon V.785 | 20 wt % | | | | |
| Elastomer MB1 | | 20 wt % | | | |
| Engage 8150 | | | 20 wt % | | |
| Elastomer MB2 | | | | 20 wt % | |
| Elastomer MB3 | | | | | 20 wt % |
| Elastomer MB4 | | | | | |
| Elastomer MB5 | | | | | |
| Elastomer MB6 | | | | | |
| Elastomer MB7 | | | | | |
| Elastomer MB8 | | | | | |
| Talc Staemic 00S | 9.9 wt % | 9.9 wt % | 9.9 wt % | 9.9 wt % | 9.9 wt % |
| Irganox B215 | 0.1 wt % | 0.1 wt % | 0.1 wt % | 0.1 wt % | 0.1 wt % |
| Physical Properties: | | | | | |
| E-Modulus (MPa) | 1353 | 1399 | 1414 | 1239 | 1283 |
| Stress at Yield (MPa) | 17.4 | 18.5 | 19.1 | 16.6 | 17.4 |
| Stress at Break (MPa) | 13.4 | 14.5 | 16.8 | 14.5 | 14.2 |
| Elongation at Break (%) | 140 | 74 | >170 | >170 | >170 |
| Flexural Modulus (MPa) | 1365 | 1347 | 1433 | 1282 | 1173 |
| Impact Properties: | | | | | |
| IZOD Impact: | | | | | |
| Notched −10° C. (kJ/m$^2$) | 17.4 B | 11.6 B | 14.9 B | 44 D (2/5) | 35.9 D (5/5) |
| Notched −20° C. (kJ/m$^2$) | 12.1 B | 10.0 B | 8.9 B | 16.9 B | 13.1 B |
| CHARPY Impact: | | | | | |
| Notched −10° C. (kJ/m$^2$) | 21.6 D (1/5) | 12.1 B | 13.1 B | 28.9 D (4/5) | 26.9 D (4/5) |
| Notched −20° C. (kJ/m$^2$) | 8.7 B | 8.2 B | 7.3 B | 14.2 B | 16.5 B |
| Dark Drop −20° C.: | | | | | |
| E at F. max (J) | 33 | 35 | 34 | 37 | 33 |
| (Initiator) | 60 | 67 | 66 | 73 | 62 |
| E total (J) | 27 | 31 | 32 | 35 | 29 |
| E propagation (J) | 5.4 | 5.6 | 5.3 | 6.2 | 5.5 |
| Time (total) (mil. sec) | D (5/5) | D (5/5) | D (5/5) | D (5/5) | D (5/5) |
| Observation | | | | | |
| Dart Drop −30° C.: | | | | | |
| E at F. max (J) | 35 | 37 | 39 | 39 | 42 |
| (Initiation) | 64 | 65 | 66 | 73 | 79 |
| E total (J) | 29 | 28 | 27 | 35 | 37 |
| E propagation (J) | 5 | 4.4 | 4.5 | 5.5 | 5.9 |
| Time (total) (mil. sec) | D (4/5) | B | B | D (4/5) | D (5/5) |
| Observation | | | | | |
| Dart Drop −40° C.: | | | | | |
| E at F. max (J) | 37 | | | 38 | 39 |
| (Initiation) | 65 | | | 68 | 71 |
| E total (J) | 28 | | | 30 | 32 |
| E propagation (J) | 4.6 | | | 4.8 | 5 |
| Time (total) (mil. sec) | B | | | B | D (1/5) |
| Observation | | | | | |
| MFI (g/10 min) (230° C.; 2.16 kg) | 5.5 | 4.5 | 4.7 | 5.8 | 6.8 |

|  | Example 6 | Example 7 | Example 8 | Example 9 | Example 10 |
|---|---|---|---|---|---|
| Impact Modified PP Composition | | | | | |
| Eltex PRV 210 | 70 wt % | 70 wt % | 70 wt % | 70 wt % | 70 wt % |
| Vistalon V.785 | | | | | |
| Elastomer MB1 | | | | | |

TABLE 2-continued

|  |  |  |  |  |  |
|---|---|---|---|---|---|
| Engage 8150 |  |  |  |  |  |
| Elastomer MB2 |  |  |  |  |  |
| Elastomer MB3 |  |  |  |  |  |
| Elastomer MB4 | 20 wt % |  |  |  |  |
| Elastomer MB5 |  | 20 wt % |  |  |  |
| Elastomer MB6 |  |  | 20 wt % |  |  |
| Elastomer MB7 |  |  |  | 20 wt % |  |
| Elastomer MB8 |  |  |  |  | 20 wt % |
| Talc Staemic 00S | 9.9 wt % | 9.9 wt % | 9.9 wt % | 9.9 wt % | 9.9 wt % |
| Irganox B215 | 0.1 wt % | 0.1 wt % | 0.1 wt % | 0.1 wt % | 0.1 wt % |
| Physical Properties: |  |  |  |  |  |
| E-Modulus (MPa) | 1268 | 1245 | 1184 | 1189 | 1447 |
| Stress at Yield (MPa) | 17.1 | 16.9 | 17.5 | 17.7 | 17.6 |
| Stress at Break (MPa) | 14.8 | 15.1 | 15.1 | 15.3 | 15.3 |
| Elongation at Break (%) | >170 | >170 | >170 | >170 | >170 |
| Flexural Modulus (MPa) | 1262 | 1293 | 1206 | 1234 | 1206 |
| Impact Properties: |  |  |  |  |  |
| IZOD Impact: |  |  |  |  |  |
| Notched −10° C. (kJ/m$^2$) | 36.3 D (2/5) | 23.4 B | 19.4 B | 20.1 B | 22 B |
| Notched −20° C. (kJ/m$^2$) | 18.3 B | 14.2 B | 12.3 B | 10.8 B | 10.9 B |
| CHARPY Impact: |  |  |  |  |  |
| Notched −10° C. (kJ/m$^2$) | 27.2 D (4/5) | 24.9 D (3/5) | 23 D (3/5) | 22 D (2/5) | 26.9 D (4/5) |
| Notched −20° C. (kJ/m$^2$) | 14.0 B | 12.6 B | 10.4 B | 12.6 B | 10.9 B |
| Dark Drop −20° C.: |  |  |  |  |  |
| E at F. max (J) | 33 | 34 | 33 | 34 | 34 |
| (Initiator) | 64 | 64 | 64 | 64 | 65 |
| E total (J) | 32 | 30 | 31 | 30 | 31 |
| E propagation (J) | 5.9 | 5.8 | 5.7 | 5.8 | 5.6 |
| Time (total) (mil. sec) | D (5/5) | D (5/5) | D (5/5) | D (5/5) | D (5/5) |
| Observation |  |  |  |  |  |
| Dark Drop −30° C.: |  |  |  |  |  |
| E at F. max (J) | 36 | 36 | 37 | 35 | 36 |
| (Initiation) | 66 | 67 | 70 | 69 | 72 |
| E total (J) | 30 | 31 | 33 | 34 | 36 |
| E propagation (J) | 4.9 | 5.2 | 5.6 | 5.4 | 5.5 |
| Time (total) (mil. sec) | D (3/5) | D (4/5) | D (4/5) | D (2/5) | D (1/5) |
| Observation |  |  |  |  |  |
| Dark Drop −40° C.: |  |  |  |  |  |
| E at F. max (J) | 38 | 39 | 39 | 41 | 40 |
| (Initiation) | 68 | 70 | 77 | 76 | 74 |
| E total (J) | 30 | 31 | 36 | 35 | 34 |
| E propagation (J) | 4.6 | 4.8 | 5.2 | 4.9 | 4.7 |
| Time (total) (mil. sec) | B | B | D (2/5) | B | B |
| Observation |  |  |  |  |  |
| MFI (g/10 min) | 5 | 6 | 5.1 | 4.8 | 5 |
| (230° C.; 2.16 kg) |  |  |  |  |  |

Note:
B: brittle failure
D: ductile failure
D (X/Y): X = number of the non-broken sample
Y = total number of samples tested
*: comparative

TABLE 3

|  | Example 11* | Example 12* | Example 13 | Example 14 |
|---|---|---|---|---|
| Impact Modified PP Composition |  |  |  |  |
| Appyl 3250 MR5 | 70 wt % | 70 wt % | 70 wt % | 70 wt % |
| Engage 8150 | 20 wt % |  |  |  |
| Elastomer MB1 |  | 20 wt % |  |  |
| Elastomer MB2 |  |  | 20 wt % |  |
| Elastomer MB4 |  |  |  | 20 wt % |
| Elastomer MB5 |  |  |  |  |
| Elastomer MB6 |  |  |  |  |
| Elastomer MB7 |  |  |  |  |
| Elastomer MB8 |  |  |  |  |
| Talc Staemic 00S | 9.9 wt % | 9.9 wt % | 9.9 wt % | 9.9 wt % |
| Irganox B215 | 0.1 wt % | 0.1 wt % | 0.1 wt % | 0.1 wt % |

TABLE 3-continued

| Physical Properties: | | | | |
|---|---|---|---|---|
| E-Modulus (MPa) | 1295 | 1262 | 1269 | 1073 |
| Stress at Yield (MPa) | 18.9 | 17.5 | 17.3 | 16.9 |
| Stress at Break (MPa) | 15.2 | 13.7 | 14 | 14.1 |
| Elongation at Break (%) | 176 | 72 | 122 | >177 |
| Flexural Modulus (MPa) | 1293 | 1262 | 1061 | 1149 |
| Impact Properties: IZOD Impact: | | | | |
| Notched −10° C. (kJ/m$^2$) | 6.8 B | 7.9 B | 10.3 B | 9.9 B |
| Notched −20° C. (kJ/m$^2$) | 6.7 B | 7.3 B | 8.6 B | 8.9 B |
| CHARPY Impact: | | | | |
| Notched −10° C. (kJ/m$^2$) | 7.3 B | 7.8 B | 9.7 B | 10.2 B |
| Notched −20° C. (kJ/m$^2$) | 6.4 B | 7 B | 8.9 B | 6.4 B |
| Dark Drop −20° C.: | | | | |
| E at F. max (J) (Initiator) | 33 | 36 | 34 | 33 |
| E total (J) | 64 | 54 | 64 | 63 |
| E propagation (J) | 31 | 18 | 30 | 30 |
| Time (total) (mil. sec) | 5 | 4.2 | 5.4 | 5.5 |
| Observation | D (2/5) | D (1/3) | D (3/5) | D (5/5) |
| Dark Drop −30° C.: | | | | |
| E at F. max (J) (Initiation) | 38 | 38 | 40 | 38 |
| E total (J) | 69 | 50 | 74 | 70 |
| E propagation (J) | 31 | 12 | 34 | 32 |
| Time (total) (mil. sec) | 4.9 | 3.5 | 5.4 | 5.3 |
| Observation | B | B | D (3/5) | D (4/5) |
| Dark Drop −40° C.: | | | | |
| E at F. max (J) (Initiation) | | | 42 | 39 |
| E total (J) | | | 65 | 73 |
| E propagation (J) | | | 23 | 35 |
| Time (total) (mil. sec) | | | 4 | 5 |
| Observation | | | B | D (2/5) |
| MFI (g/10 min) (230° C.; 2.16 kg) | 12 | 10.5 | 16.2 | 12.2 |

| | Example 15 | Example 16 | Example 17 | Example 18 |
|---|---|---|---|---|
| Impact Modified PP Composition | | | | |
| Appyl 3250 MR5 | 70 wt % | 70 wt % | 70 wt % | 70 wt % |
| Engage 8150 | | | | |
| Elastomer MB1 | | | | |
| Elastomer MB2 | | | | |
| Elastomer MB4 | | | | |
| Elastomer MB5 | 20 wt % | | | |
| Elastomer MB6 | | 20 wt % | | |
| Elastomer MB7 | | | 20 wt % | |
| Elastomer MB8 | | | | 20 wt % |
| Talc Staemic OOS | 9.9 wt % | 9.9 wt % | 9.9 wt % | 9.9 wt % |
| Irganox B215 | 0.1 wt % | 0.1 wt % | 0.1 wt % | 0.1 wt % |
| Physical Properties: | | | | |
| E-Modulus (MPa) | 1197 | 1090 | 1101 | 1097 |
| Stress at Yield (MPa) | 17.6 | 17.5 | 17.5 | 17.7 |
| Stress at Break (MPa) | 13.9 | 14 | 14.3 | 14.5 |
| Elongation at Break (%) | >177 | >177 | >177 | >177 |
| Flexural Modulus (MPa) | 1192 | 1102 | 1122 | 1113 |
| Impact Properties: IZOD Impact: | | | | |
| Notched −10° C. (kJ/m$^2$) | 9.4 B | 9.7 B | 10 B | 8.5 B |
| Notched −20° C. (kJ/m$^2$) | 6.3 B | 8.1 B | 8 B | 7.9 B |
| CHARPY Impact: | | | | |
| Notched −10° C. (kJ/m$^2$) | 9.1 B | 9.7 B | 9.4 B | 8.8 B |
| Notched −20° C. (kJ/m$^2$) | 7.6 B | 8.4 B | 8.3 B | 7.5 B |
| Dark Drop −20° C.: | | | | |
| E at F. max (J) (Initiator) | 34 | 34 | 34 | 35 |
| E total (J) | 64 | 65 | 64 | 69 |
| | 30 | 31 | 30 | 34 |

TABLE 3-continued

| | | | | |
|---|---|---|---|---|
| E propagation (J) | 5.6 | 5.5 | 5.4 | 5.9 |
| Time (total) (mil. sec) | D (4/5) | D (4/5) | D (3/5) | D (5/5) |
| Observation | | | | |
| Dark Drop −30° C.: | | | | |
| E at F. max (J) | 38 | 35 | 37 | 39 |
| (Initiation) | 73 | 63 | 71 | 76 |
| E total (J) | 35 | 28 | 34 | 37 |
| E propagation (J) | 5.4 | 4.9 | 5.4 | 5.7 |
| Time (total) (mil. sec) | D (4/5) | D (3/5) | D (2/4) | D (4/5) |
| Observation | | | | |
| Dark Drop −40° C.: | | | | |
| E at F. max (J) | 38 | 40 | 40 | 35 |
| (Initiation) | 70 | 71 | 75 | 52 |
| E total (J) | 32 | 31 | 35 | 17 |
| E propagation (J) | 4.8 | 4.7 | 4.9 | 3.5 |
| Time (total) (mil. sec) | D (1/5) | D (1/5) | B | B |
| Observation | | | | |
| MFI (g/10 min) (230° C.; 2.16 kg) | 12.4 | 12.8 | 12.1 | 13.3 |

Note:
B: brittle failure
D: ductile failure
D (X/Y): X = number of the non-broken sample
Y = total number of samples tested
*: comparative

What is claimed is:

1. An impact modified polypropylene comprising polypropylene and an impact modifier composition, said composition comprising a blend of:
   (a) 40 to 95% by weight of at least one ethylene/propylene/diene random copolymer containing up to 80 weight % ethylene and up to 15 weight % nonconjugated diene containing 5 to 20 carbon atoms; and
   (b) 60 to about 5% by weight of at least one low-density ethylene/$C_4$ to $C_{20}$ α-olefin random copolymer having a density of 0.860 to 0.910 gm/cm$^3$ and prepared by metallocene catalysis.

2. A process for preparing impact modified polypropylene composition comprising melt mixing polypropylene and an impact modifier composition comprising a blend of:
   (a) 40 to 95% by weight of at least one ethylene/propylene/diene random copolymer containing up to 80 weight % ethylene and up to 15 weight % nonconjugated diene containing 5 to 20 carbon atoms; and
   (b) 60 to about 5% by weight of at least one low-density ethylene/$C_4$ to $C_{20}$ α-olefin random copolymer having a density of 0.860 to 0.910 gm/cm$^3$ and prepared by metallocene catalysis.

3. An impact modifier blend comprising:
   (a) 40 to 95% by weight of at least one ethylene/propylene/diene random copolymer containing up to 80 weight % ethylene, and up to 15 weight % nonconjugated diene containing 5 to 20 carbon atoms; and
   (b) 60 to about 5% by weight of at least one low-density ethylene/$C_4$ to $C_{20}$ α-olefin random copolymer having a density of 0.860 to 0.910 g/cm$^3$ and prepared by metallocene catalysis.

4. The impact modified polypropylene of claim 1 wherein said non-conjugated diene is selected from the group consisting of 5-ethylidene-2-norbornene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene and 5-vinylnorbornene.

5. The impact modified polypropylene of claim 1 wherein said ethylene/propylene random copolymer contains 0.1 of 5.0 wt % of said non-conjugated diene.

6. The impact modified polypropylene of claim 1 wherein said ethylene/propylene random copolymer contains 40 to 65 weight % of ethylene.

7. The polypropylene composition of claim 1 containing 4 to 60% by weight of said impact modifier composition.

8. The polypropylene composition of claim 7 containing 7 to 30% by weight of said impact modifier composition.

9. The polypropylene composition of claim 1 wherein said ethylene/propylene random copolymer contains 0.1 to 5.0 wt % of said non-conjugated diene.

10. The polypropylene composition of claim 1 wherein said ethylene/propylene random copolymer contains 40 to 65 weight % ethylene.

11. The polypropylene composition of claim 1 wherein the olefin of said low density ethylene/α-olefin random copolymer contains 4 to 12 carbon atoms.

12. The process of claim 2 wherein said polypropylene is mixed with 7 to 30% by weight of said impact modifier composition.

13. The blend of claim 3 wherein said ethylene/propylene random copolymer contains 40 to 65 weight % of ethylene.

* * * * *